(12) United States Patent
Wu et al.

(10) Patent No.: US 11,702,174 B2
(45) Date of Patent: Jul. 18, 2023

(54) AUTOMATIC WATER SURFACE SKIMMER

(71) Applicant: Nuoya Robot (Zhejiang) Co., Ltd., Zhejiang (CN)

(72) Inventors: Yajun Wu, Zhejiang (CN); Xinyue Fan, Zhejiang (CN); Jingming Li, Zhejiang (CN); Hongwei Tan, Zhejiang (CN)

(73) Assignee: NUOYA ROBOT (ZHEJIANG) CO., LTD., Zhejiang (CN)

( * ) Notice: Subject to any disclaimer, the term of this patent is extended or adjusted under 35 U.S.C. 154(b) by 331 days.

(21) Appl. No.: 17/015,906

(22) Filed: Sep. 9, 2020

(65) Prior Publication Data
US 2021/0197932 A1 Jul. 1, 2021

(30) Foreign Application Priority Data

Dec. 31, 2019 (CN) .......................... 201911412052.9

(51) Int. Cl.
*B63B 35/32* (2006.01)
*B63B 59/02* (2006.01)
(Continued)

(52) U.S. Cl.
CPC .............. *B63B 35/32* (2013.01); *B63B 59/02* (2013.01); *E04H 4/1654* (2013.01); *G01S 13/08* (2013.01)

(58) Field of Classification Search
CPC ....... B63B 35/32; B63B 59/02; E04H 4/1654; E04H 4/1672; G01S 13/08
See application file for complete search history.

(56) References Cited

U.S. PATENT DOCUMENTS

2015/0259940 A1* 9/2015 Renaud ................. E04H 4/1672
  15/1.7
2017/0022728 A1* 1/2017 Simik ..................... C02F 1/001
  (Continued)

FOREIGN PATENT DOCUMENTS

CN  103935476 B  9/2017

*Primary Examiner* — Andrew Polay
(74) *Attorney, Agent, or Firm* — Muncy, Geissler, Olds & Lowe, P.C.

(57) ABSTRACT

The present application discloses an automatic water surface skimmer, belonging to the technical field of water surface cleaning. For the existing anti-collision structure, most of impact force is transmitted to a hull through an anti-collision wheel, resulting in that the anti-collision wheel and the hull are damaged, the anti-collision effect is poor, and the service life of the anti-collision wheel and the hull is influenced. Further, garbage collected by adopting the existing solution is easily scatteredly fallen from an opening, and the collection effect is not good. The body of the automatic water surface skimmer is provided with an accommodating cavity running through upper and lower portions, such that a storage member can be placed from the top to the bottom, and it is convenient for a user to disassemble and assemble the storage member. Further, by changing the existing design that the water surface garbage enters from the opening in the front end of the storage member to the design that the garbage enters from the opening in the upper end of the storage member, the collected garbage can be effectively prevented from being scatteredly fallen from the opening in the front end, and the collection effect is good. In addition, the present application includes an anti-collision structure with at least two anti-collision wheels, such that the impact force can be effectively decomposed, the anti-collision effect is good, and the service life of the anti-collision wheels and the body can be effectively prolonged.

19 Claims, 9 Drawing Sheets

(51) Int. Cl.
　　　*E04H 4/16*　　　　(2006.01)
　　　*G01S 13/08*　　　(2006.01)

(56) References Cited

U.S. PATENT DOCUMENTS

2019/0301188 A1* 10/2019 Smith, Jr. ............. E04H 4/1654
2020/0095792 A1*  3/2020 Miller ................... E04H 4/1654
2021/0129948 A1*  5/2021 Wang .................... E02B 15/046

* cited by examiner

AUTOMATIC WATER SURFACE SKIMMER

TECHNICAL FIELD

The present application relates to an automatic water surface skimmer, belonging to the technical field of water surface cleaning.

BACKGROUND ART

Chinese patent (Publication No.: CN103935476b) provides an autonomous navigation automatic water surface skimmer. The autonomous navigation automatic water surface skimmer includes a hull. A control device and a driving device are provided on the hull. The control device includes a video acquisition device, a navigation device, a central processing unit and a communication module. The driving device, the video acquisition device, the navigation device and the communication module are all connected with the central processing unit. A garbage collection frame placed at the lower portion of the hull is further provided on the hull. A collection opening of the garbage collection frame is located in the advancing direction of the hull. A base station provided on the ground communicates with the central processing unit in a wireless manner. An operator controls the hull to operate through the base station to collect garbage on the water surface. An anti-collision wheel is further provided on the side of the hull.

However, the above solution has the following problems:

Problem 1: since the garbage collection frame is provided at the lower portion of the hull, it is not convenient for a user to disassemble and assemble the garbage collection frame. Moreover, since the collection opening of the garbage collection device is provided in the front end and the front end is provided with the opening, the collected garbage is easily scatteredly fallen from the opening and the collection effect is not good.

Especially when the speed of the hull is slow, the whole garbage collection frame and garbage are submerged in the water and the water flow is turbulent, or when the hull changes direction, the garbage is very easily taken out by the water, resulting that the garbage collection effect is poor.

Problem 2: the above-mentioned anti-collision wheel is rotationally connected with the hull through a rotating shaft. When the anti-collision wheel collides with other objects, although the anti-collision wheel can rotate, the extension direction of most of the impact force will intersect with the rotating shaft of the anti-collision wheel, and most of the impact force will be transmitted to the hull through the anti-collision wheel, resulting in that the anti-collision wheel and the hull are damaged, the anti-collision effect is poor, and the service life of the anti-collision wheel and the hull is influenced.

SUMMARY

In view of the defects of the prior art, the first purpose of the present application is to provide an automatic water surface skimmer, which includes an anti-collision structure with at least two anti-collision wheels, can effectively decompose the impact force, has a good anti-collision effect, and can effectively prolong the service life of anti-collision wheels and a body; at the same time, the body is provided with an accommodating cavity running through upper and lower portions, such that a storage member can be placed from the top to the bottom, and it is convenient for a user to disassemble and assemble the storage member; further, by changing the existing design that the water surface garbage enters from the opening in the front end of the storage member to the design that the garbage enters from the opening in the upper end of the storage member, the collected garbage can be effectively prevented from being scatteredly fallen from the opening in the front end, and the collection effect is good.

The second purpose of the present application is to provide an automatic water surface skimmer, which includes a body with an accommodating cavity running through upper and lower portions, such that a storage member can be placed from the top to the bottom, and it is convenient for a user to disassemble and assemble the storage member; further, by changing the existing design that the water surface garbage enters from the opening in the front end of the storage member to the design that the garbage enters from the opening in the upper end of the storage member, the collected garbage can be effectively prevented from being scatteredly fallen from the opening in the front end, and the collection effect is good.

The third purpose of the present application is to provide a convenient-to-clean automatic water surface skimmer, which includes a body with an accommodating cavity running through upper and lower portions, such that a storage member can be placed from the top to the bottom; in addition, a cover plate and the storage member are separately provided, the upper end of the storage member is provided with a holding part or holding member which is convenient to hold, such that it is convenient for a user to disassemble and assemble the storage member and the user can directly disassemble and assemble the storage member on the water surface close to the bank.

In order to realize the first purpose and solve the problem 1 and problem 2 in the background art, the present application adopts the following technical solution:

An automatic water surface skimmer includes a body with an accommodating cavity and a storage member with at least one through hole;

an anti-collision assembly is assembled on the outer edge of the body;

the anti-collision assembly includes at least two anti-collision wheels assembled together;

the two anti-collision wheels re fixedly connected to the side end of the body in a rotatable manner through a connecting member;

the storage member is a cavity structure with an opening in an upper end and is assembled on the body in a detachable manner;

the body is provided with the accommodating cavity running through upper and lower portions, and the accommodating cavity is provided with an upper opening for placing the storage member from the top to the bottom;

the storage member or the body is rotationally connected with a rolling member capable of driving garbage to enter the cavity structure.

Through continuous exploration and test, the present application breaks the technical bias that only one anti-collision wheel is provided in the existing anti-collision structure; by providing the anti-collision structure with at least two anti-collision wheels, the impact force can be effectively decomposed, the anti-collision effect is good, and the service life of the anti-collision wheels and the body is prolonged.

When the body of the skimmer provided by the present application collides with other objects, in most cases, they will firstly collide with one anti-collision wheel in the anti-collision assembly. Since the axis of the anti-collision wheel does not coincide with the axis of the rotation of the anti-collision assembly around the body, the impact force will be converted into the rotating force of the anti-collision wheel at this moment, such that the anti-collision wheel and the anti-collision assembly rotate around the body, the impact force can be effectively decomposed and thus the impact damage can be effectively avoided.

At the same time, since two anti-collision wheels are assembled together, at least one anti-collision wheel can abut against other objects even if the anti-collision assembly rotates, such that the body can be effectively prevented from colliding with other objects, and the structure is simple, practical and ingenious.

In the present application, the body is provided with an accommodating cavity running through the upper and lower portion, such that a storage member can be placed from the top to the bottom, and it is convenient for a user to disassemble and assemble the storage member. In the present application, a garbage collection opening is provided in the upper end of the storage member, and the existing design that the water surface garbage enters from the opening in the front end of the storage member is changed to the design that the garbage enters from the opening in the upper end of the storage member, such that the collected garbage can be effectively prevented from being scatteredly fallen from the opening in the front end.

In order to facilitate the garbage to flow into the cavity of the storage member, a rolling member is provided to drive the garbage to enter the storage member, and the movement of the body and the suction of the garbage are configured independently, such that the collection of the garbage can be realized without moving the skimmer, the energy can be effectively saved and the working time of the skimmer is prolonged; at the same time, by changing the original passive entry to active entry, the collection efficiency is high and the water surface garbage cleaning effect is better.

As preferred technical measures, the anti-collision assembly includes three anti-collision wheels arranged in a staggered manner, the three anti-collision wheels are arranged in a regular triangle shape, and the axis extension directions of the anti-collision wheels are in parallel. Since the anti-collision wheels are evenly distributed, it is further ensured that other objects can meet one of the anti-collision wheels no matter the collision is happened to the anti-collision assembly in which angle, and at least one anti-collision wheel can correspond to other objects no matter how the anti-collision assembly rotates.

The number of the anti-collision wheels may also be four or more. When the number is more than three, the anti-collision effect enhancement is not obvious, and the manufacturing cost and assembly difficulty will increase. Those skilled in the art may select according to the actual situation.

The connecting member is a triangular member, and the protruding side ends of the connecting member are respectively connected with one anti-collision wheel, preventing the connecting member from interfering with the collision position.

As preferred technical means, the rolling member is assembled with a sheet structure capable of producing a water flow and the sheet structure is adjacent to the opening in the upper end of the cavity structure.

The sheet structure is a strip-shaped blade or brush member, and the upper edge of the strip-shaped blade is higher than the upper edge of the storage member, such that the driven garbage can automatically fall into the cavity of the storage member under the effect of the water flow and the gravity, and the structure is simple and practical.

The projections of the strip-shaped blade and the opening in the upper end of the storage member in a vertical direction at least partially coincide, such that the driven garbage directly falls into the cavity of the storage member, and the garbage is effectively prevented from falling.

The two sides of the rear end of the body are respectively assembled with a driver for pushing the body to move.

In order to realize the second purpose and solve the problem 1 in the background art, the present application adopts the following technical solution:

An automatic water surface skimmer includes a body with an accommodating cavity and a storage member with at least one through hole;

the storage member is a cavity structure with an opening in an upper end and is assembled on the body in a detachable manner;

the body is provided with the accommodating cavity running through upper and lower portions, and the accommodating cavity is provided with an upper opening for placing the storage member from the top to the bottom;

the storage member or the body is rotationally connected with a rolling member capable of driving garbage to enter the cavity structure.

In the present application, the body is provided with an accommodating cavity running through the upper and lower portion, such that a storage member can be placed from the top to the bottom, and it is convenient for a user to disassemble and assemble the storage member. In the present application, a garbage collection opening is provided in the upper end of the storage member, and the existing design that the water surface garbage enters from the opening in the front end of the storage member is changed to the design that the garbage enters from the opening in the upper end of the storage member, such that the collected garbage can be effectively prevented from being scatteredly fallen from the opening in the front end.

In order to facilitate the garbage to flow into the cavity of the storage member, a rolling member is provided to drive the garbage to enter the storage member, and the movement of the body and the suction of the garbage are configured independently, such that the collection of the garbage can be realized without moving the skimmer, the energy can be effectively saved and the working time of the skimmer is prolonged; at the same time, by changing the original passive entry to active entry, the collection efficiency is high and the water surface garbage cleaning effect is better.

As preferred technical measures, the rolling member is assembled with a sheet structure capable of producing a water flow and the sheet structure is adjacent to the opening in the upper end of the cavity structure.

The sheet structure is a strip-shaped blade or brush member, and the upper edge of the strip-shaped blade is higher than the upper edge of the storage member, such that the driven garbage can automatically fall into the cavity of the storage member under the effect of the water flow and the gravity, and the structure is simple and practical.

The projections of the strip-shaped blade and the opening in the upper end of the storage member in a vertical direction at least partially coincide, such that the driven garbage directly falls into the cavity of the storage member, and the garbage is effectively prevented from falling.

The two sides of the rear end of the body are respectively assembled with a driver for pushing the body to move.

As preferred technical measures, the rolling member is assembled at the upper end portion of the storage member and is connected with a driving source;

the driving source is assembled on the body and is connected with the rolling member through a gear set.

Due to the limited structural space of the storage member, it is impossible to mount a battery and a corresponding circuit. In order to realize the energy supply of the driving source, the driving source is assembled on the body. At the same time, in order to realize the flexible disassembly of the storage member, the driving source and the rolling member are connected through a gear pair to realize the effective contact and rapid separation of the driving source and the rolling member. The design is ingenious and the solution is feasible.

The gear set includes a gear I fixedly connected with the rolling member and a gear II fixedly connected with a rotating end of the driving source; the face of the gear I is perpendicular to the axial extension line of the rolling member; the face of the gear II is perpendicular to the axial extension line of the rotating end of the driving source.

As preferred technical measures, the storage member is provided with a holding part or holding member which is convenient for a user to hold, and a cover plate is provided above the holding part or holding member;

one end of the cover plate is hinged on the body, and the cover face of the cover plate partially or completely covers the opening in the upper end of the storage member; the other end of the cover plate is connected with a lifting assembly for driving the cover plate to go up and down; the lifting assembly is an air rod, a hydraulic rod, or a ball screw assembly.

In the present application, the cover plate and the storage member are separately provided, the cover plate is hinged on the body, the cover face of the cover plate can cover the storage member, and no cover plate is separately provided on the storage member, such that it is convenient for a user to disassemble and assemble the storage member; at the same time, the upper end of the storage member is provided with a holding part or a holding member, such that it is more convenient for a user to disassemble and assemble the storage member; furthermore, a user can directly disassemble and assemble the storage member on the water surface without pulling the skimmer ashore, it is simple and easy to operate, it is convenient for a user to clean the automatic water surface skimmer, and the user experience is good.

In the present application, the holding part or holding member is hidden in the cover plate, such that the overall attractiveness of the skimmer is not influenced and the visual feeling is good.

At the same time, the cover plate provided on the body can effectively limit the upward movement of the storage member, and there is no need to add other structures to limit the upward movement of the storage member. Therefore, the parts needed in the present application are fewer, it is easy to realize production, and the manufacturing cost can be effectively reduced.

The storage member is provided with a connecting part for assembling the rolling member, and the connecting part is an arc-shaped structure, is rotationally connected with the rolling member and is mounted on the body;

the two sides of the internal portion of the body are respectively provided with an arc-shaped notch; the arc-shaped structure is fit with the shape of the arc-shaped notch, such that the effective limitation of the rolling member is realized, while the normal rotation of the rolling member is not influenced, and the structure is simple and practical.

The inner wall of the upper end of the accommodating cavity of the body is provided with at least one section of retaining part; the retaining part extends into the cavity to form a supporting structure capable of abutting against the storage member. The body limits the storage member through the retaining part, there is no need to provide a screwing structure, furthermore, it is convenient for a user to directly pick and place the storage member on the body, and the structure is simple and practical.

The outer wall of the upper end of the storage member is provided with at least one section of protruding rib; the protruding rib extends outwards, protrudes out of the main body of the storage member and is capable of mounted on the upper wall surface of the retaining part of the body;

the vertical distance between the upper wall surface of the retaining part and the upper end surface of the body is A; the vertical distance between the lower wall surface of the protruding rib and the upper end surface of the storage member is B; A is greater than or equal to B.

As preferred technical measures, the holding member is a handle member horizontally provided on the two sides or two ends of the storage member;

the handle member is located at the transverse center of gravity of the storage member, such that the stress is uniform when a user holds the holding member.

The lower end of the storage member is fixedly connected with a disinfection box with an accommodating space; the disinfection box is provided with a plurality of holes, and a box cover of the disinfection box is detachably assembled on the main body of the disinfection box.

The disinfection box and the storage member are integrally provided, there is no need to provide other structures, the functions of disinfection and garbage collection are realized at the same time, it is convenient for producing and manufacturing in structure, while it is convenient for a user to observe the use situation of disinfection products such as disinfectant or disinfection solid, and thus timely replacement is facilitated. A user can directly know the use situation of disinfection products or replace them when picking and placing the storage member, the time and effort are saved, and the user experience is good.

The cover plate is obliquely assembled on the body, the front end of the cover plate is lower than the rear end, and the front end and the rear end are in smooth transition;

the rear end of the cover plate is hinged on the body and the front end is clamped on the body.

The upper end surface of the cover plate is covered with a solar panel for absorbing solar energy, and a transparent window which is convenient for observing the collection situation of the storage member is provided in the central position of the cover plate.

The lower end of the body is provided with a trumpet-shaped opening at a position adjacent to the rolling member, and the outer diameter of the trumpet-shaped opening is larger than the inner diameter;

the cavity structure of the storage member is a box structure with a front wall surface, a rear wall surface, a left wall surface, a right wall surface, and a lower wall surface; at least the rear wall surface and the lower wall surface are respectively provided with a plurality of through holes.

One of the connecting part of the storage member and the cover plate is provided with a square groove, and the other is provided with a square protrusion; the structural shapes of the square groove and the square protrusion are fit with each other. As the driving source drives the rolling member to rotate, it will produce torque and make the storage member vibrate. Therefore, square limiting structures are provided on the connecting part and the cover plate to realize the effective limitation of the storage member through the cover plate. The structure is simple and practical.

As preferred technical measures, the outer edge of the body is provided with an anti-collision assembly;

the anti-collision assembly includes at least two anti-collision wheels assembled together;

the two anti-collision wheels are fixedly connected with the side ends of the body in a rotatable manner through a connecting member.

Through continuous exploration and test, the present application breaks the technical bias that only one anti-collision wheel is provided in the existing anti-collision structure; by providing the anti-collision structure with at least two anti-collision wheels, the impact force can be effectively decomposed, the anti-collision effect is good, and the service life of the anti-collision wheels and the body is prolonged.

When the body of the skimmer provided by the present application collides with other objects, in most cases, they will firstly collide with one anti-collision wheel in the anti-collision assembly. Since the axis of the anti-collision wheel does not coincide with the axis of the rotation of the anti-collision assembly around the body, the impact force will be converted into the rotating force of the anti-collision wheel at this moment, such that the anti-collision wheel and the anti-collision assembly rotate around the body, the impact force can be effectively decomposed and thus the impact damage can be effectively avoided.

At the same time, since two anti-collision wheels are assembled together, at least one anti-collision wheel can abut against other objects even if the anti-collision assembly rotates, such that the body can be effectively prevented from colliding with other objects, and the structure is simple, practical and ingenious.

Preferably, the anti-collision assembly includes three anti-collision wheels arranged in a staggered manner, the three anti-collision wheels are arranged in a regular triangle shape, and the axis extension directions of the anti-collision wheels are in parallel. Since the anti-collision wheels are evenly distributed, it is further ensured that other objects can meet one of the anti-collision wheels no matter the collision is happened to the anti-collision assembly in which angle, and at least one anti-collision wheel can correspond to other objects no matter how the anti-collision assembly rotates.

The number of the anti-collision wheels may also be four or more. When the number is more than three, the anti-collision effect enhancement is not obvious, and the manufacturing cost and assembly difficulty will increase. Those skilled in the art may select according to the actual situation.

The connecting member is a triangular member, and the protruding side ends of the connecting member are respectively connected with one anti-collision wheel, preventing the connecting member from interfering with the collision position.

As preferred technical measures, a pin hole I for connecting the body is provided in the center of the triangular member, pin holes II for connecting the anti-collision wheels are respectively provided in the triangular side ends of the triangular member;

the triangular member is pinned on the body in a rotatable manner through the pin hole I;

the anti-collision wheels are pinned on the triangular member in a rotatable manner through the pin holes II.

The anti-collision wheels can rotate independently, thus further improving the anti-collision effect and decreasing the impact wear.

As preferred technical measures, the body is a square structure, and the four side ends or the two side surfaces of the front end of the square structure are respectively provided with one anti-collision assembly; the body can be effectively prevented from colliding with other objects, and the structure is simple and practical.

The anti-collision assembly is partially or completely exposed out of the body, and the anti-collision assembly is partially exposed, such that the structural attractiveness can be effectively improved and the structure of the present application is enabled to be compact.

As preferred technical measures, the body is provided with a mounting cavity for accommodating part of the structure of the anti-collision assembly.

At least two anti-collision wheels are exposed out of the mounting cavity, and the structure is simple and practical.

As preferred technical measures, the two sides of the front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end. Due to the large measurement error of the existing ranging sensor for short distance, by mounting the transmitting end deep in the cavity, the transmitting distance of the transmitting end is increased, the ranging accuracy can be effectively improved, the design is ingenious, and the solution is practical and feasible.

The ranging sensor is a laser ranging sensor, an ultrasonic ranging sensor, or an infrared ranging sensor.

In order to realize the third purpose and solve the problem 1 in the background art, the present application provides an alternative technical solution:

An automatic water surface skimmer includes a body with an accommodating cavity and a storage member with at least one through hole.

The storage member is a cavity structure with an opening in an upper end and is assembled on the body in a detachable manner;

the body is provided with the accommodating cavity running through upper and lower portions, and the accommodating cavity is provided with an upper opening for placing the storage member from the top to the bottom;

the storage member is provided with a holding part or holding member which is convenient for a user to hold, and a cover plate is provided above the holding part or holding member;

one end of the cover plate is hinged on the body, and the cover face of the cover plate partially or completely covers the opening in the upper end of the storage member.

In the present application, the body is provided with an accommodating cavity running through the upper and lower portion, such that a storage member can be placed from the top to the bottom, and it is convenient for a user to disassemble and assemble the storage member. In the present application, a garbage collection opening is provided in the upper end of the storage member, and the existing design that the water surface garbage enters from the opening in the front end of the storage member is changed to the design that the garbage enters from the opening in the upper end of the storage member, such that the collected garbage can be effectively prevented from being scatteredly fallen from the opening in the front end.

In the present application, the cover plate and the storage member are separately provided, the cover plate is hinged on the body, the cover face of the cover plate can cover the storage member, and no cover plate is separately provided on the storage member, such that it is convenient for a user to disassemble and assemble the storage member; at the same time, the upper end of the storage member is provided with a holding part or a holding member, such that it is more convenient for a user to disassemble and assemble the storage member; furthermore, a user can directly disassemble and assemble the storage member on the water surface without pulling the skimmer ashore, it is simple and easy to operate, it is convenient for a user to clean the automatic water surface skimmer, and the user experience is good.

In the present application, the holding part or holding member is hidden in the cover plate, such that the overall attractiveness of the skimmer is not influenced and the visual feeling is good.

At the same time, the cover plate provided on the body can effectively limit the upward movement of the storage member, and there is no need to add other structures to limit the upward movement of the storage member. Therefore, the parts needed in the present application are fewer, it is easy to realize production, and the manufacturing cost can be effectively reduced.

The garbage includes industrial waste, domestic garbage, animal and plant garbage, etc., such as leaves, floating paper, insect remains, water surface floating oil dirt, water surface floating dust, garbage bags, and branches.

Compared with the prior art, the present application has the following beneficial effects:

1. Through continuous exploration and test, the present application breaks the technical bias that only one anti-collision wheel is provided in the existing anti-collision structure; by providing the anti-collision structure with at least two anti-collision wheels, the impact force can be effectively decomposed, the anti-collision effect is good, and the service life of the anti-collision wheels and the body is prolonged.

When the body of the skimmer provided by the present application collides with other objects, in most cases, they will firstly collide with one anti-collision wheel in the anti-collision assembly. Since the axis of the anti-collision wheel does not coincide with the axis of the rotation of the anti-collision assembly around the body, the impact force will be converted into the rotating force of the anti-collision wheel at this moment, such that the anti-collision wheel and the anti-collision assembly rotate around the body, the impact force can be effectively decomposed and thus the impact damage can be effectively avoided.

At the same time, since two anti-collision wheels are assembled together, at least one anti-collision wheel can abut against other objects even if the anti-collision assembly rotates, such that the body can be effectively prevented from colliding with other objects, and the structure is simple, practical and ingenious.

2. In the present application, the body is provided with an accommodating cavity running through the upper and lower portion, such that a storage member can be placed from the top to the bottom, and it is convenient for a user to disassemble and assemble the storage member. In the present application, a garbage collection opening is provided in the upper end of the storage member, and the existing design that the water surface garbage enters from the opening in the front end of the storage member is changed to the design that the garbage enters from the opening in the upper end of the storage member, such that the collected garbage can be effectively prevented from being scatteredly fallen from the opening in the front end.

In order to facilitate the garbage to flow into the cavity of the storage member, according to the present invention, a rolling member is provided to drive the garbage to enter the storage member, and the movement of the body and the suction of the garbage are configured independently, such that the collection of the garbage can be realized without moving the skimmer, the energy can be effectively saved and the working time of the skimmer is prolonged; at the same time, by changing the original passive entry to active entry, the collection efficiency is high and the water surface garbage cleaning effect is better.

3. In the present application, the storage member can be placed from the top to the bottom, the cover plate and the storage member are separately provided, the cover plate is hinged on the body, the cover face of the cover plate can cover the storage member, and no cover plate is separately provided on the storage member, such that it is convenient for a user to disassemble and assemble the storage member; at the same time, the upper end of the storage member is provided with a holding part or a holding member, such that it is more convenient for a user to disassemble and assemble the storage member; furthermore, a user can directly disassemble and assemble the storage member on the water surface without pulling the skimmer ashore, it is simple and easy to operate, it is convenient for a user to clean the automatic water surface skimmer, and the user experience is good.

In the present application, the holding part or holding member is hidden in the cover plate, such that the overall attractiveness of the skimmer is not influenced and the visual feeling is good.

DESCRIPTION OF REFERENCE SIGNS

1—body; 11—accommodating cavity; 12—retaining member; 13—arc-shaped notch; 14—gear II; 15—mounting cavity; 2—cover plate; 21—limiting protrusion; 22—square protrusion; 23—solar panel; 24—transparent window; 3—storage member; 31—holding member; 32—cavity structure; 321—front wall surface; 322—rear wall surface; 323—left wall surface; 324—right wall surface; 325—lower wall surface; 33—through hole; 34—protruding rib; 35—disinfection box; 36—box cover; 37—collector; 38—connecting part; 311—limiting groove; 371—sheet structure; 372—rolling member; 373—gear I; 381—square groove; 4—trumpet-shaped opening; 5—anti-collision assembly; 51—anti-collision wheel; 52—connecting member; 521—pin hole I; 522—pin hole II; 6—driver Description of the Embodiments In order to make the purposes, technical solutions and advantages of the present application clearer, the present application will be further described below in detail in combination with the embodiments with reference to the drawings. It should be understood that the specific embodiments described herein are used for explaining the present application only, instead of limiting the present application.

On the contrary, the present application covers any replacement, modification, equivalent method and solution in the essence and scope of the present application as defined by the claims. Further, in order to make the public have a better understanding about the present application, some specific details are described below in detail in the following description of the present application. Those skilled in the art can fully understand the present application without the description of these details.

It should be noted that, when two components are "fixedly connected" or "fixedly coupled", the two components may be directly connected or there may be an intermediate component. On the contrary, when a component is called "directly located on" another component, there is no intermediate component. The terms "horizontal", "vertical", "top", "bottom" and similar expressions are used for the purpose of description only.

Unless otherwise defined, all technical and scientific terms used herein have the same meanings as those commonly understood by those skilled in the art in the field of the present application. The terms used herein are used for the purpose of describing the specific embodiments only, instead of limiting the present application.

Figure 1:
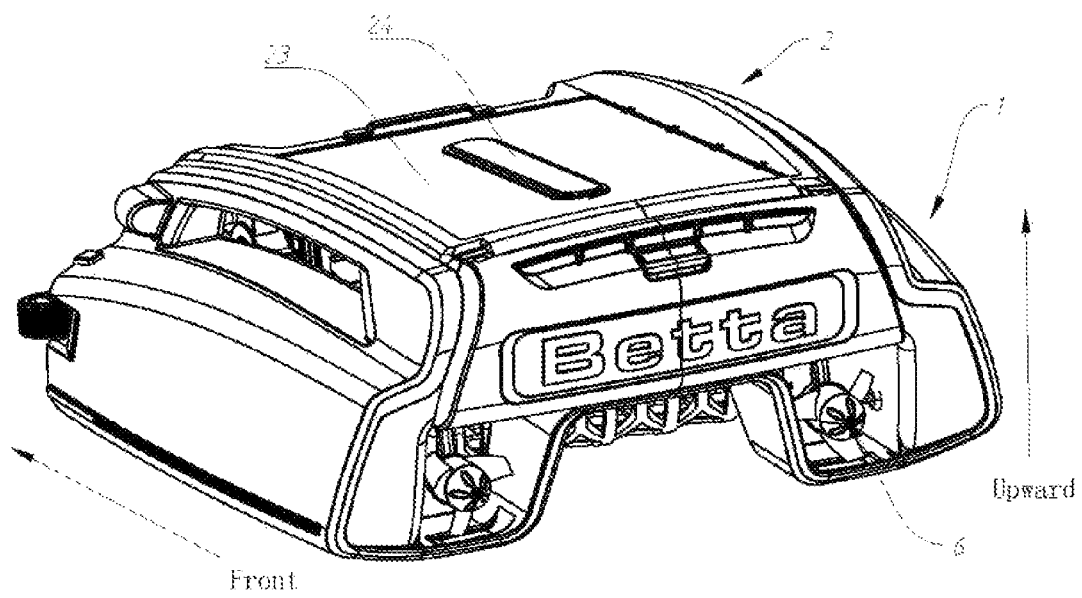
FIG. 1 is a schematic view of an overall structure according to the present application.
Figure 2:
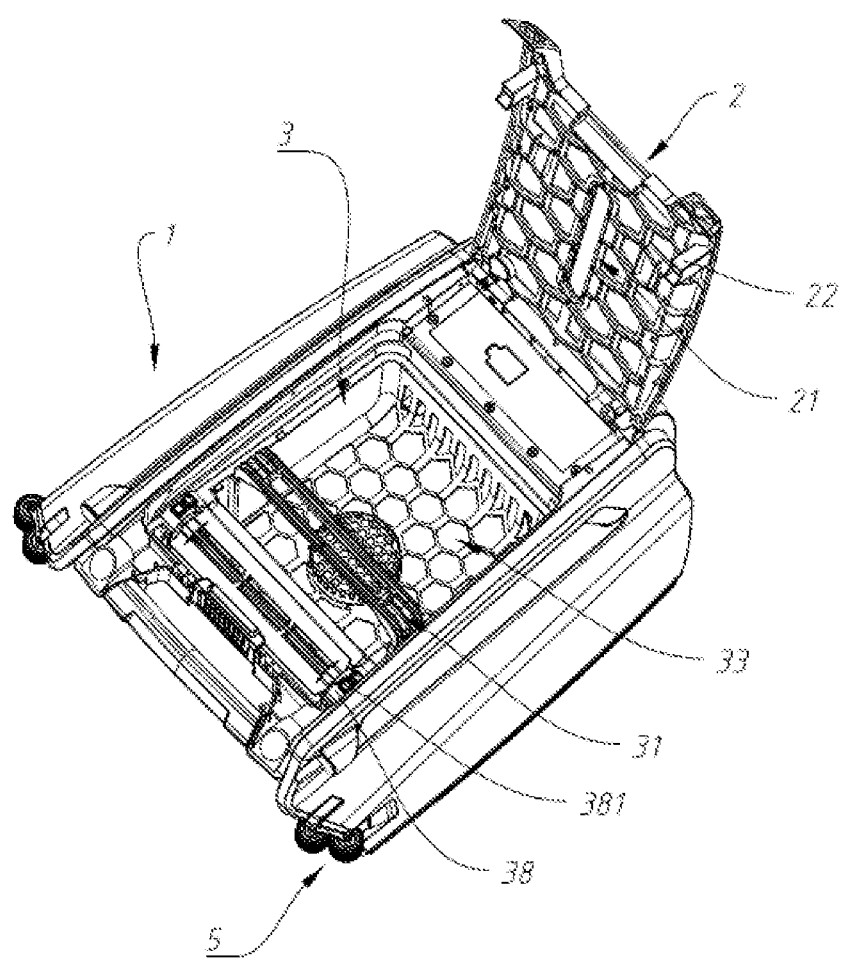
FIG. 2 is a schematic view of a structure when a cover plate is in an open state according to the present application.
Figure 3:
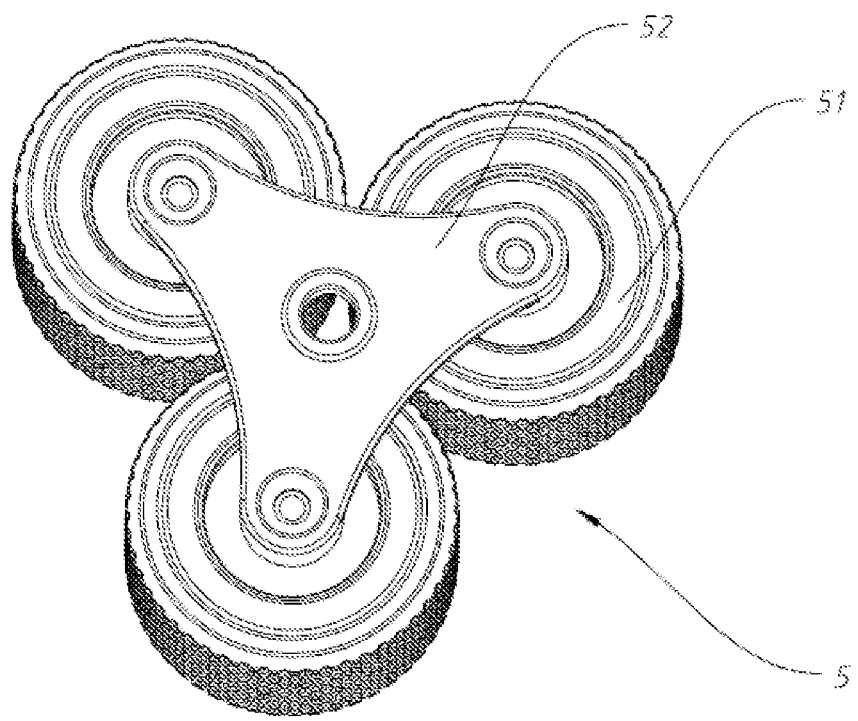
FIG. 3 is a schematic view of an anti-collision structure according to the present application.
Figure 4:
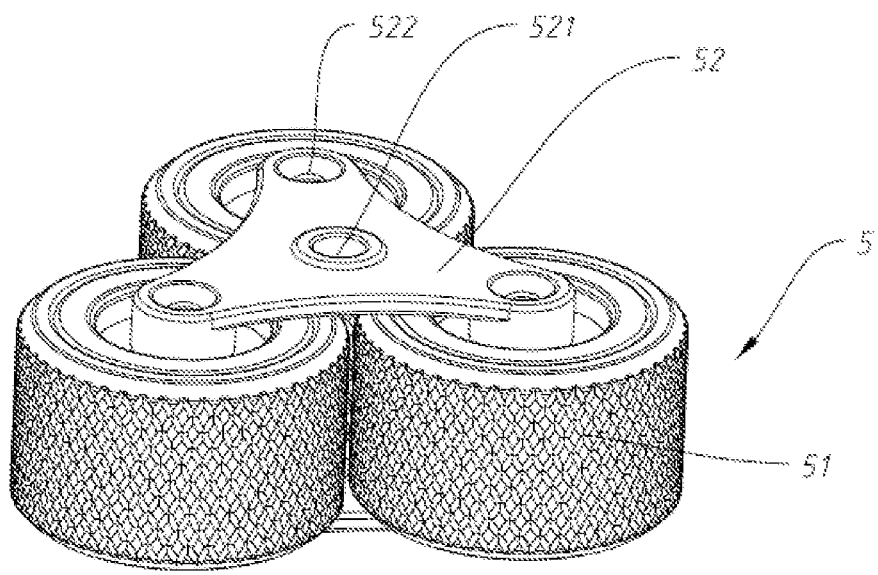
FIG. 4 is a schematic view of the structure illustrated in FIG. 3 when the viewing angle is changed for a certain angle.
Figure 5:
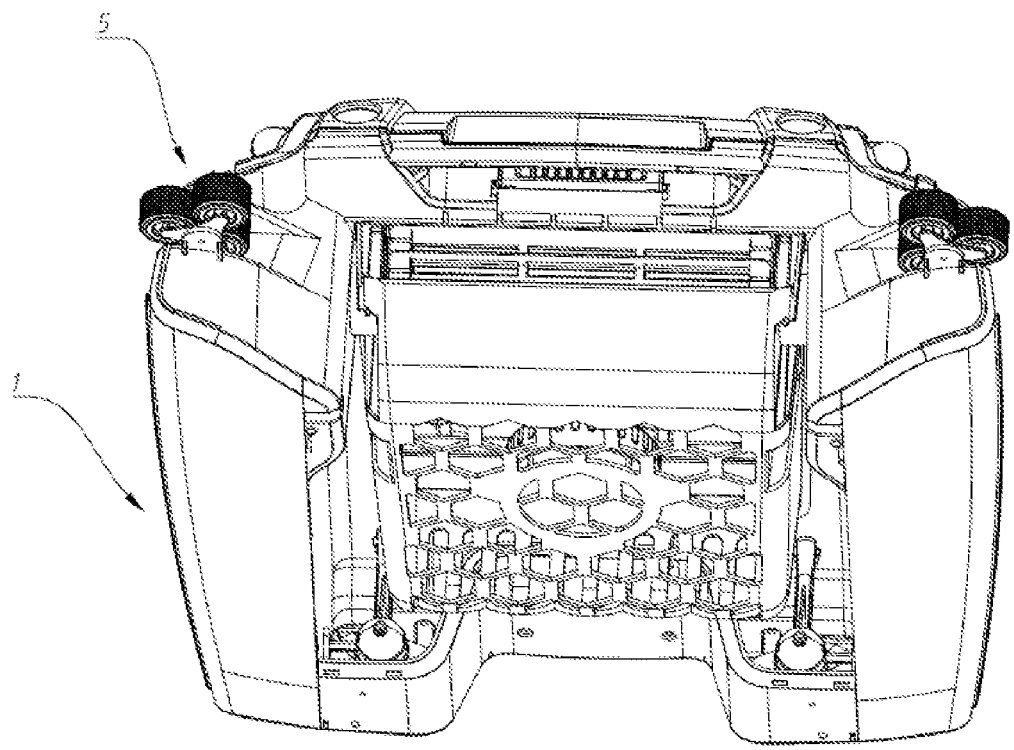
FIG. 5 is a schematic view after the structure is upwards inclined for a certain angle according to the present application.
Figure 6:
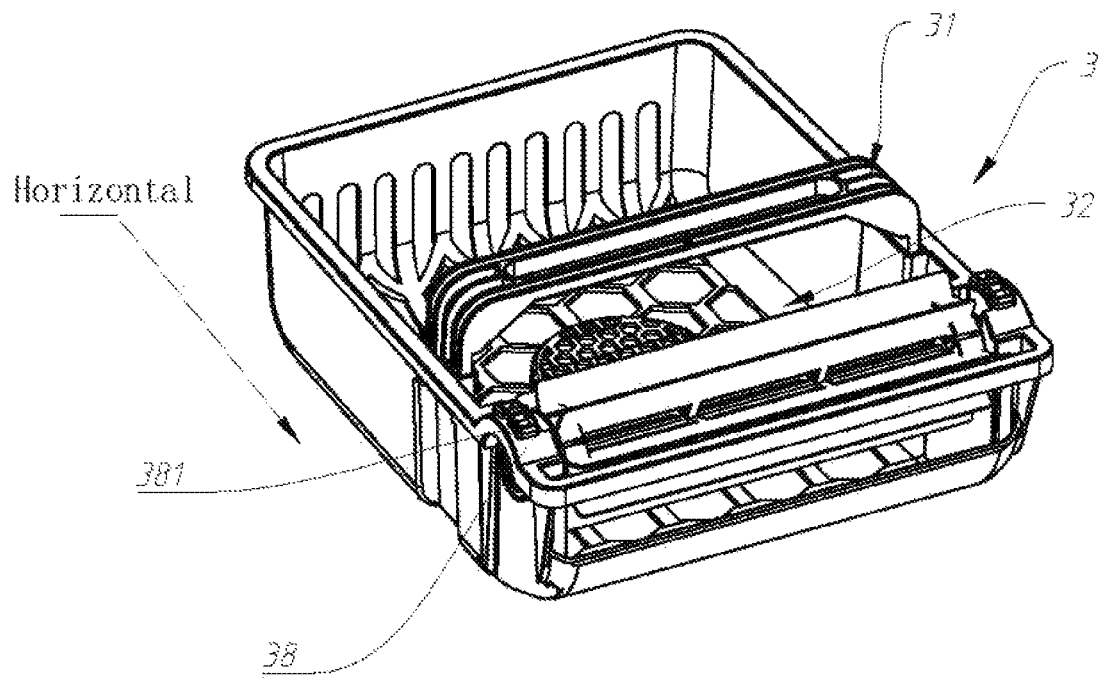
FIG. 6 is a schematic structural view of a storage member according to the present application.
Figure 7:
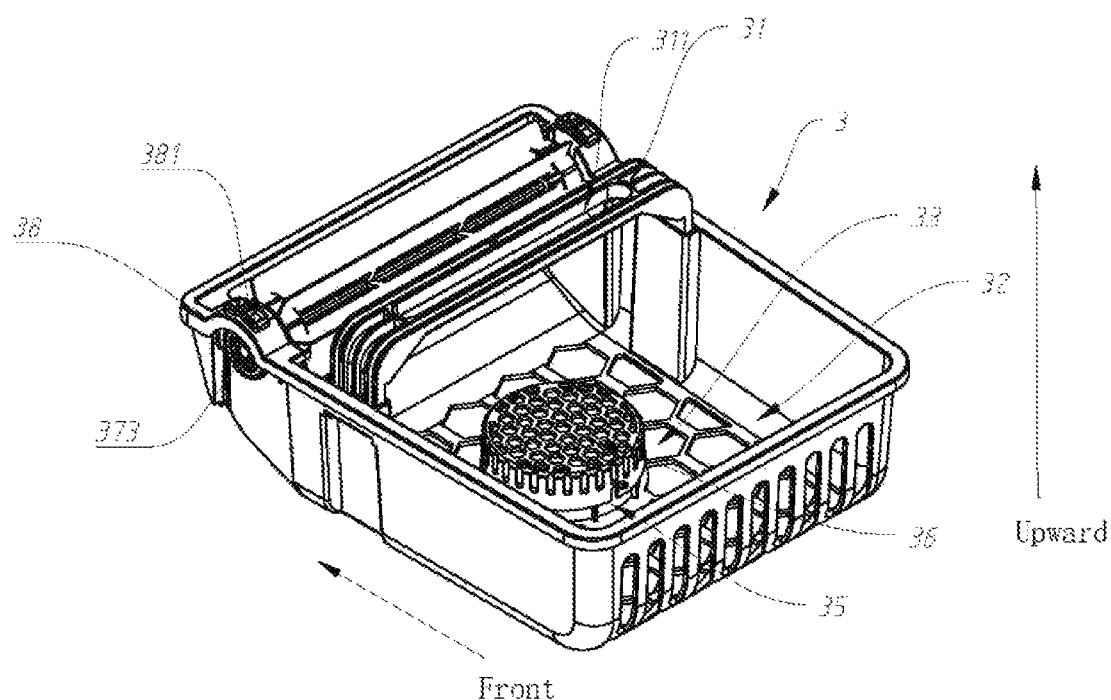
FIG. 7 is a schematic view of the structure illustrated in FIG. 6 when the viewing angle is changed for a certain angle.
Figure 8:
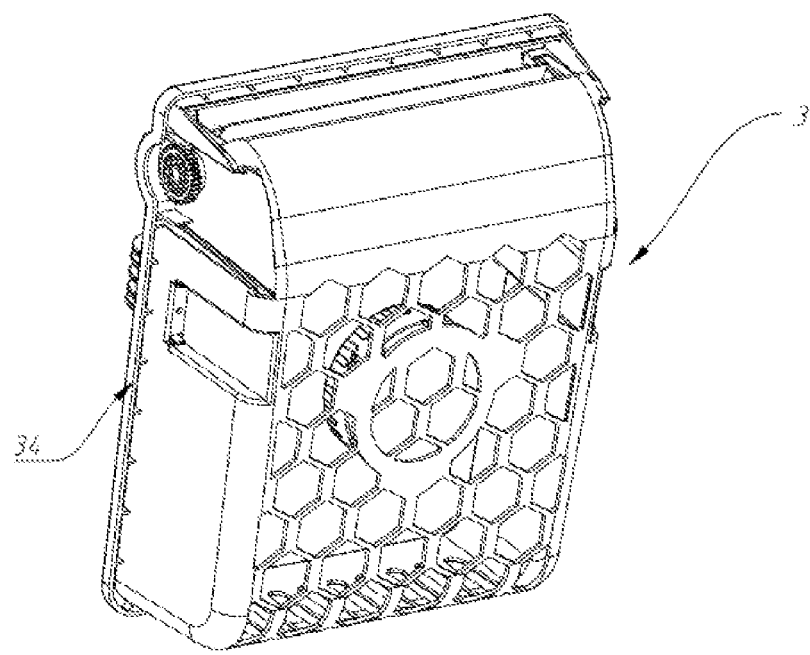
FIG. 8 is a schematic view of the structure illustrated in FIG. 7 when the viewing angle is changed for a certain angle.
Figure 9:
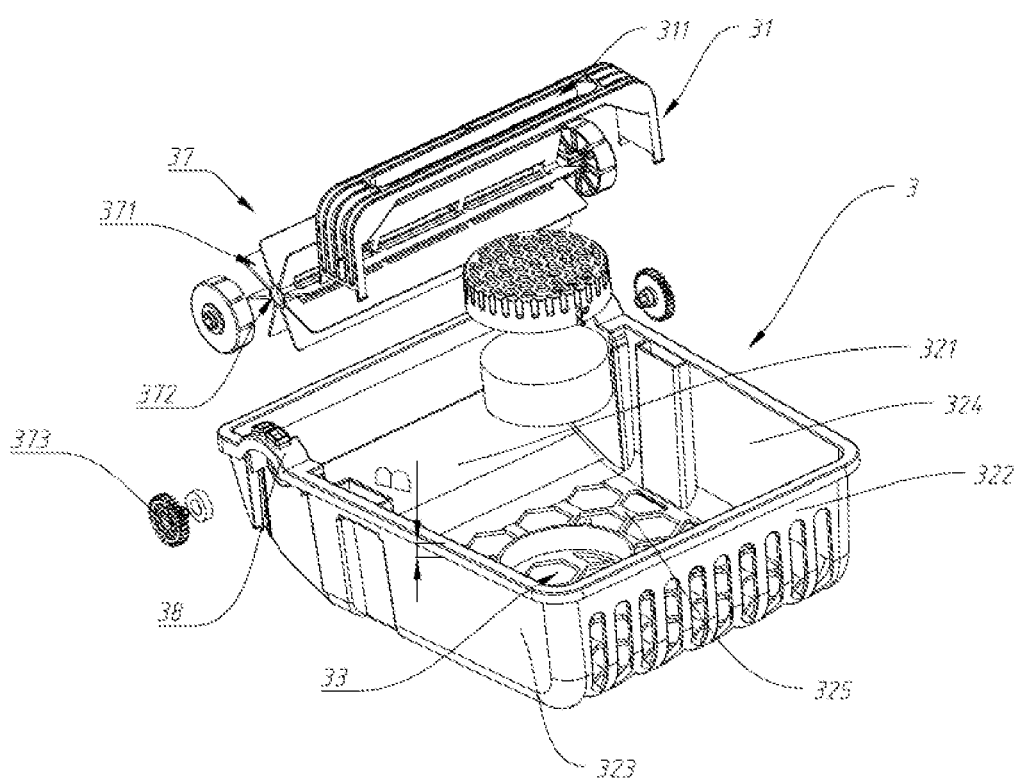
FIG. 9 is a schematic exploded view of the structure illustrated in FIG. 8.
Figure 10:
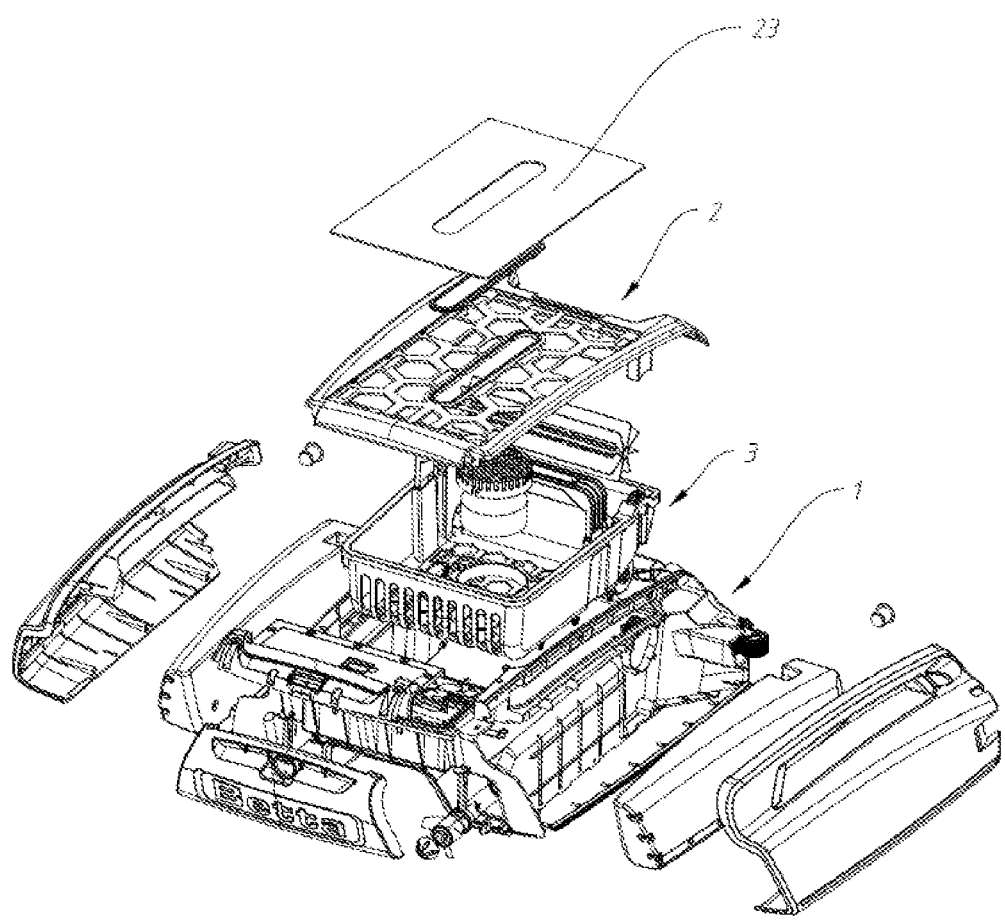
FIG. 10 is an exploded view according to the present application.
Figure 11:
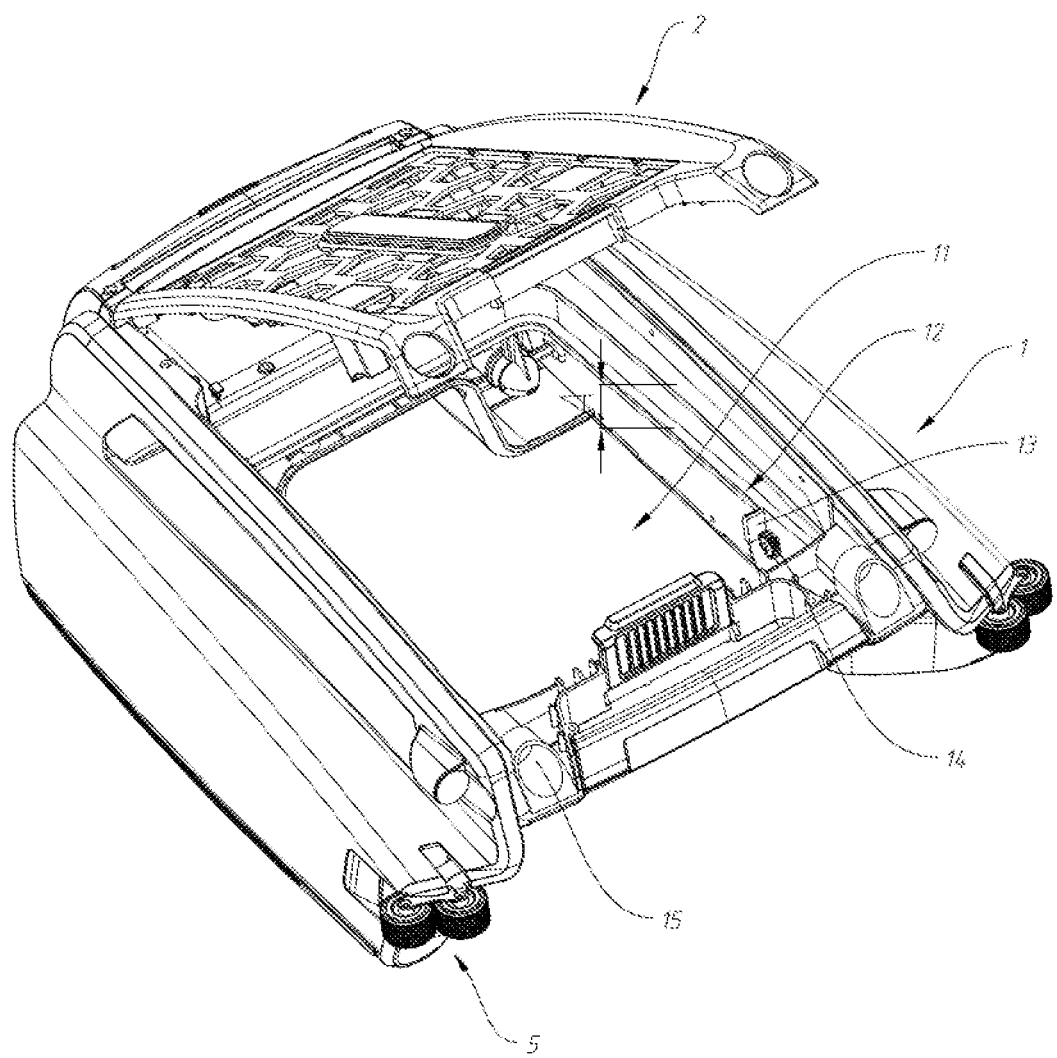
FIG. 11 is a schematic view of a structure according to the present application (with no storage member assembled).
Figure 12:
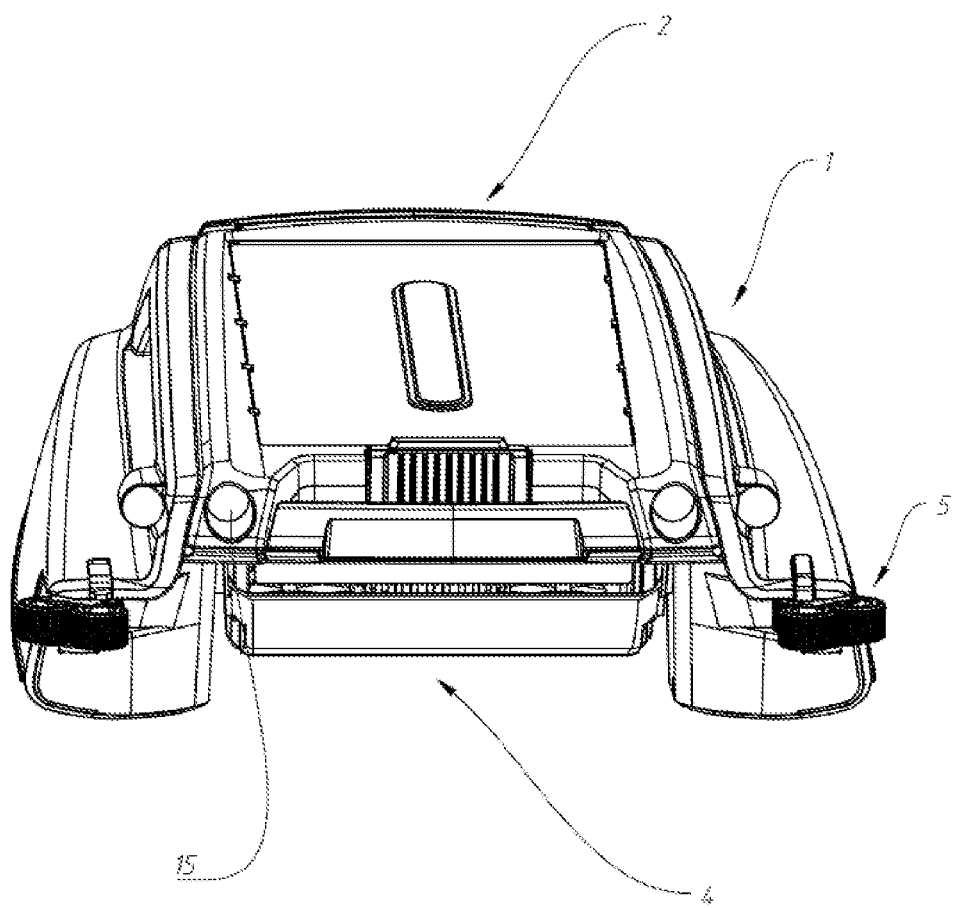
FIG. 12 is a schematic view of the structure illustrated in FIG. 1 when the viewing angle is changed for a certain angle.

Referring to FIGS. 1-12, one specific embodiment of the present application is as follow:

An automatic water surface skimmer includes a body 1 with an accommodating cavity 11 and a storage member 3 with at least one through hole 33.

The storage member 3 is a cavity structure 32 with an opening in an upper end and is assembled on the body 1 in a detachable manner.

The body 1 is provided with the accommodating cavity 11 running through upper and lower portions, and the accommodating cavity 11 is provided with an upper opening for placing the storage member 3 from the top to the bottom.

The storage member 3 or the body 1 is rotationally connected with a rolling member 372 capable of driving garbage to enter the cavity structure 32.

In the present application, the body 1 is provided with an accommodating cavity 11 running through the upper and lower portion, such that a storage member 3 can be placed from the top to the bottom, and it is convenient for a user to disassemble and assemble the storage member 3. In the present application, a garbage collection opening is provided in the upper end of the storage member 3, and the existing design that the water surface garbage enters from the opening in the front end of the storage member 3 is changed to the design that the garbage enters from the opening in the upper end of the storage member 3, such that the collected garbage can be effectively prevented from being scatteredly fallen from the opening in the front end.

In order to facilitate the garbage to flow into the cavity of the storage member 3, a rolling member 372 is provided to drive the garbage to enter the storage member 3, and the movement of the body 1 and the suction of the garbage are configured independently, such that the collection of the garbage can be realized without moving the skimmer, the energy can be effectively saved and the working time of the skimmer is prolonged; at the same time, by changing the original passive entry to active entry, the collection efficiency is high and the water surface garbage cleaning effect is better.

Another specific embodiment of the present application is as follow:

An automatic water surface skimmer includes a body 1 with an accommodating cavity 11 and a storage member 3 with at least one through hole 33.

The storage member 3 is a cavity structure with an opening in an upper end and is assembled on the body 1 in a detachable manner.

The body 1 is provided with the accommodating cavity 11 running through upper and lower portions, and the accommodating cavity 11 is provided with an upper opening for placing the storage member 3 from the top to the bottom.

The storage member 3 is provided with a holding part or holding member 31 which is convenient for a user to hold, and a cover plate 2 is provided above the holding part or holding member 31/

One end of the cover plate 2 is hinged on the body 1, and the cover face of the cover plate 2 partially or completely covers the opening in the upper end of the storage member 3.

In the present application, the cover plate 2 and the storage member 3 are separately provided, the cover plate 2 is hinged on the body 1, the cover face of the cover plate can cover the storage member 3, and no cover plate 2 is separately provided on the storage member 3, such that it is convenient for a user to disassemble and assemble the storage member 3; at the same time, the upper end of the storage member 3 is provided with a holding part or a holding member 31, such that it is more convenient for a user to disassemble and assemble the storage member 3; furthermore, a user can directly disassemble and assemble the storage member 3 on the water surface without pulling the skimmer ashore, it is simple and easy to operate, it is convenient for a user to clean the automatic water surface skimmer, and the user experience is good.

In the present application, the holding part or holding member 31 is hidden in the cover plate 2, such that the overall attractiveness of the skimmer is not influenced and the visual feeling is good.

One optimum embodiment of the present application is as follow:

An automatic water surface skimmer includes a body with an accommodating cavity and a storage member 3 with at least one through hole.

An anti-collision assembly is assembled on the outer edge of the body, and the two sides of the rear end of the body are respectively assembled with a driver 6 for pushing the body to move.

The anti-collision assembly includes at least two anti-collision wheels assembled together.

The two anti-collision wheels are fixedly connected to the side end of the body in a rotatable manner through a connecting member.

The storage member 3 is a cavity structure 32 with an opening in an upper end and is assembled on the body 1 in a detachable manner.

The body 1 is provided with the accommodating cavity 11 running through upper and lower portions, and the accommodating cavity 11 is provided with an upper opening for placing the storage member 3 from the top to the bottom.

The storage member 3 or the body 1 is rotationally connected with a rolling member 372 capable of driving garbage to enter the cavity structure 32.

Through continuous exploration and test, the present application breaks the technical bias that only one anti-collision wheel 51 is provided in the existing anti-collision structure; by providing the anti-collision structure with at least two anti-collision wheels 51, the impact force can be effectively decomposed, the anti-collision effect is good, and the service life of the anti-collision wheels 51 and the body 1 is prolonged.

When the body 1 of the skimmer provided by the present application collides with other objects, in most cases, they will firstly collide with one anti-collision wheel 51 in the anti-collision assembly 5. Since the axis of the anti-collision wheel 51 does not coincide with the axis of the rotation of the anti-collision assembly 5 around the body 1, the impact force will be converted into the rotating force of the anti-collision wheel 51 at this moment, such that the anti-collision wheel 51 and the anti-collision assembly 5 rotate around the body 1, the impact force can be effectively decomposed and thus the impact damage can be effectively avoided.

At the same time, since two anti-collision wheels 51 are assembled together, at least one anti-collision wheel 51 can abut against other objects even if the anti-collision assembly 5 rotates, such that the body 1 can be effectively prevented from colliding with other objects, and the structure is simple, practical and ingenious.

In the present application, a garbage collection opening is provided in the upper end of the storage member 3, and the existing design that the water surface garbage enters from the opening in the front end of the storage member 3 is changed to the design that the garbage enters from the opening in the upper end of the storage member 3, such that the collected garbage can be effectively prevented from being scatteredly fallen from the opening in the front end.

In the present application, in order to facilitate the garbage to flow into the cavity of the storage member 3, a rolling member 372 is provided to drive the garbage to enter the storage member 3, and the movement of the body 1 and the suction of the garbage are configured independently, such that the collection of the garbage can be realized without moving the skimmer, the energy can be effectively saved and the working time of the skimmer is prolonged; at the same time, by changing the original passive entry to active entry, the collection efficiency is high and the water surface garbage cleaning effect is better.

The two sides of the body are respectively mounted with a driver, such that it is convenient to adjust the advancing direction of the skimmer. The lower end of the body 1 is provided with a trumpet-shaped opening 4 at a position adjacent to the rolling member 372, and the outer diameter of the trumpet-shaped opening 4 is larger than the inner diameter.

One specific embodiment of the structure of the anti-collision assembly 5 of the present application is as follow:

The anti-collision assembly 5 includes three anti-collision wheels 51 arranged in a staggered manner, the anti-collision wheels 51 are arranged in a regular triangle shape, and the axis extension directions of the anti-collision wheels are in parallel. Since the anti-collision wheels 51 are evenly distributed, it is further ensured that other objects can meet one of the anti-collision wheels 51 no matter the collision is happened to the anti-collision assembly 5 in which angle, and at least one anti-collision wheel 51 can correspond to other objects no matter how the anti-collision assembly rotates. The structure is simple and practical. As compared with two wheels, three anti-collision wheels 51 are assembled together, such that the anti-collision effect can be further improved, referring to FIGS. 3-4.

The connecting member 52 is a triangular member, and the protruding side ends of the connecting member 52 are respectively connected with one anti-collision wheel 51, preventing the connecting member 52 from interfering with the collision position.

A pin hole I 521 for connecting the body 1 is provided in the center of the triangular member.

Pin holes II 522 for connecting the anti-collision wheels 51 are respectively provided in the triangular side ends of the triangular member.

The triangular member is pinned on the body 1 in a rotatable manner through the pin hole I 521.

The anti-collision wheels 51 are pinned on the triangular member in a rotatable manner through the pin holes II 522.

The anti-collision wheels 51 can rotate independently, thus further improving the anti-collision effect and decreasing the impact wear.

Another specific embodiment of the structure of the anti-collision assembly 5 of the present application is as follow:

The number of the anti-collision wheels 51 may also be four or more. When the number is more than three, the anti-collision effect enhancement is not obvious, and the manufacturing cost and assembly difficulty will increase. Those skilled in the art may select according to the actual situation.

One specific embodiment of the assembling position of the anti-collision assembly 5 of the present application is as follow:

The body 1 is a square structure, and the four side ends or the two side surfaces of the front end of the square structure are respectively provided with one anti-collision assembly 5; the body 1 can be effectively prevented from colliding with other objects, and the structure is simple and practical.

The anti-collision assembly 5 is partially or completely exposed out of the body 1, and the anti-collision assembly 5 is partially exposed, such that the structural attractiveness can be effectively improved and the structure of the present application is enabled to be compact.

The body 1 is provided with a mounting cavity for accommodating part of the structure of the anti-collision assembly 5.

At least two anti-collision wheels 51 are exposed out of the mounting cavity, and the structure is simple and practical.

One specific embodiment of additionally provided ranging sensors of the present application is as follow:

The two sides of the front end of the body 1 are respectively provided with a mounting cavity 15 with an opening in a front end for mounting a ranging sensor.

The ranging sensor is assembled deep in the mounting cavity 15, and a transmitting end of the ranging sensor faces to the opening in the front end of the mounting cavity 15.

There is a certain distance between the transmitting end and the opening in the front end. Due to the large measurement error of the existing ranging sensor for short distance, by mounting the transmitting end deep in the mounting cavity 15, the transmitting distance of the transmitting end is increased, the ranging accuracy can be effectively improved, the design is ingenious, and the solution is practical and feasible.

The ranging sensor is a laser ranging sensor, an ultrasonic ranging sensor, or an infrared ranging sensor.

One specific embodiment of the rolling member of the present application is as follow:

The rolling member 372 is assembled with a sheet structure 371 capable of producing a water flow and the sheet structure 371 is adjacent to the opening in the upper end of the cavity structure 32.

In the present application, the opening in the upper end adjacent to the storage member 3 is assembled with a sheet structure 371 capable of producing a water flow, the sheet structure 371 and the rolling member 372 form a collector 37 capable of collecting the garbage, the garbage near the skimmer can be effectively collected, there is no need to collect the garbage along a specific direction, the collection efficiency of the skimmer is further improved, the garbage cleaning effect is improved, and the user experience is good.

The sheet structure 371 is a strip-shaped blade or brush member, and the upper edge of the strip-shaped blade is higher than the upper edge of the storage member 3, such that the driven garbage can automatically fall into the cavity of the storage member 3 under the effect of the water flow and the gravity, and the structure is simple and practical.

The projections of the strip-shaped blade and the opening in the upper end of the storage member 3 in a vertical direction at least partially coincide, such that the driven garbage directly falls into the cavity of the storage member 3, and the garbage is effectively prevented from falling.

One specific embodiment of an additionally provided driving structure of the present application is as follow:

The rolling member 372 is assembled at the upper end portion of the storage member 3 and is connected with a driving source.

The driving source is assembled on the body 1 and is connected with the rolling member 372 through a gear set.

Due to the limited structural space of the storage member 3, it is impossible to mount a battery and a corresponding circuit. In order to realize the energy supply of the driving source, the driving source is assembled on the body 1. At the same time, in order to realize the flexible disassembly of the storage member 3, the driving source and the rolling member 372 are connected through a gear pair to realize the effective contact and rapid separation of the driving source and the rolling member 372. The design is ingenious and the solution is feasible.

The gear set includes a gear I 373 fixedly connected with the rolling member 372 and a gear II 14 fixedly connected with a rotating end of the driving source; the face of the gear I 373 is perpendicular to the axial extension line of the rolling member 372; the face of the gear II 14 is perpendicular to the axial extension line of the rotating end of the driving source.

One specific embodiment of an additionally provided holding structure and cover plate 2 of the present application is as follow:

The storage member 3 is provided with a holding part or holding member 31 which is convenient for a user to hold, and a cover plate 2 is provided above the holding part or holding member 31.

One end of the cover plate 2 is hinged on the body 1, and the cover face of the cover plate 2 partially or completely covers the opening in the upper end of the storage member 3; the other end of the cover plate is connected with a lifting assembly for driving the cover plate to go up and down; the lifting assembly is an air rod, a hydraulic rod, or a ball screw assembly.

In the present application, the cover plate 2 and the storage member 3 are separately provided, the cover plate 2 is hinged on the body 1, the cover face of the cover plate can cover the storage member 3, and no cover plate 2 is separately provided on the storage member 3, such that it is convenient for a user to disassemble and assemble the storage member 3; at the same time, the upper end of the storage member 3 is provided with a holding part or a holding member 31, such that it is more convenient for a user to disassemble and assemble the storage member 3; furthermore, a user can directly disassemble and assemble the storage member 3 on the water surface without pulling the skimmer ashore, it is simple and easy to operate, it is convenient for a user to clean the automatic water surface skimmer, and the user experience is good.

In the present application, the holding part or holding member 31 is hidden in the cover plate 2, such that the overall attractiveness of the skimmer is not influenced and the visual feeling is good.

At the same time, the cover plate 2 provided on the body 1 can effectively limit the upward movement of the storage member 3, and there is no need to add other structures to limit the upward movement of the storage member 3. Therefore, the parts needed in the present application are fewer, it is easy to realize production, and the manufacturing cost can be effectively reduced.

The storage member 3 is provided with a connecting part 38 for assembling the rolling member 372, and the connecting part 38 is an arc-shaped structure, is rotationally connected with the rolling member 372 and is mounted on the body 1.

The two sides of the internal portion of the body 1 are respectively provided with an arc-shaped notch 13; the arc-shaped structure is fit with the shape of the arc-shaped notch 13, such that the effective limitation of the rolling member 372 is realized, while the normal rotation of the rolling member 372 is not influenced, and the structure is simple and practical.

The inner wall of the upper end of the accommodating cavity 11 of the body 1 is provided with at least one section of retaining part 12; the retaining part 12 extends into the cavity to form a supporting structure capable of abutting against the storage member 3. The body 1 limits the storage member 3 through the retaining part 12, there is no need to provide a screwing structure, it is more convenient for a user to directly pick and place the storage member 3 on the body 1, and the structure is simple and practical.

The outer wall of the upper end of the storage member 3 is provided with at least one section of protruding rib 34; the protruding rib 34 extends outwards, protrudes out of the main body of the storage member 3 and is capable of mounted on the upper wall surface of the retaining part 12 of the body 1.

The vertical distance between the upper wall surface of the retaining part 12 and the upper end surface of the body 1 is A; the vertical distance between the lower wall surface 325 of the protruding rib 34 and the upper end surface of the storage member 3 is B; A is greater than or equal to B.

The holding member 31 is a handle member horizontally provided on the two sides or two ends of the storage member 3.

The handle member is located at the transverse center of gravity of the storage member 3, such that the stress is uniform when a user holds the holding member.

One specific embodiment of an additionally provided disinfection box 35 of the present application is as follow:

The lower end of the storage member 3 is fixedly connected with a disinfection box 35 with an accommodating space; the disinfection box 35 is provided with a plurality of holes, and a box cover 36 of the disinfection box is detachably assembled on the main body of the disinfection box 35.

The disinfection box 35 and the storage member 3 are integrally provided, there is no need to provide other structures, the functions of disinfection and garbage collection are realized at the same time, it is convenient for producing and manufacturing in structure, it is convenient for a user to observe the use situation of disinfection products such as disinfectant or disinfection solid, and timely replacement is facilitated. A user can directly know the use situation of disinfection products or replace them when picking and placing the storage member 3, the time and effort are saved, and the user experience is good.

One specific embodiment of the cover plate of the present application is as follow:

The cover plate 2 is obliquely assembled on the body 1, the front end of the cover plate 2 is lower than the rear end, and the front end and the rear end are in smooth transition; the rear end of the cover plate 2 is hinged on the body 1 and the front end is clamped on the body 1.

The upper end surface of the cover plate 2 is covered with a solar panel 23 for absorbing solar energy, and a transparent window 24 which is convenient for observing the collection situation of the storage member 3 is provided in the central position of the cover plate 2.

One specific embodiment of the storage member of the present application is as follow:

The cavity structure 32 of the storage member 3 is a box structure with a front wall surface 321, a rear wall surface 322, a left wall surface 323, a right wall surface 324, and a lower wall surface 325; at least the rear wall surface 322 and the lower wall surface 325 are respectively provided with a plurality of through holes 33. The diameter of the through hole is smaller than the width of the garbage to be collected, or the inner cavity of the storage member is covered with a filter screen to prevent the collected garbage from falling.

One specific embodiment of a limiting structure of the present application is as follow:

One of the connecting part 38 of the storage member 3 and the cover plate 2 is provided with a square groove 381, and the other is provided with a square protrusion 22; the structural shapes of the square groove 381 and the square protrusion 22 are fit with each other. As the driving source drives the rolling member 372 to rotate, it will produce torque and make the storage member 3 vibrate. Therefore, square limiting structures are provided on the connecting part 38 and the cover plate 2 to realize the effective limitation of the storage member 3 through the cover plate 2. The structure is simple and practical.

One of the holding member and the cover plate 2 is provided with a limiting groove 311, and the other is provided with a limiting protrusion 21; the structural shapes of the limiting groove 311 and the limiting protrusion 21 are fit with each other.

The garbage includes industrial waste, domestic garbage, animal and plant garbage, etc., such as leaves, floating paper, insect remains, water surface floating oil dirt, water surface floating dust, garbage bags, and branches.

In the present application, fixed coupling or fixed connection mode may be screwing, welding, riveting or inserting, or connection through a third part. Those skilled in the art may select according to the actual situation.

What are described above are just exemplary embodiments of the present application and are not used for limiting the present application. Any modification, equivalent replacement and improvement made within the spirit and principle of the present application shall be included in the scope of protection of the present application.

The invention claimed is:

1. An automatic water surface skimmer, comprising a body with an accommodating cavity and a storage member with at least one through hole, wherein
   an anti-collision assembly is assembled on an outer edge of the body;
   the anti-collision assembly comprises at least two anti-collision wheels assembled together;
   the two anti-collision wheels are fixedly connected to a side end of the body in a rotatable manner through a connecting member;
   the storage member is a cavity structure with an opening in an upper end and is assembled on the body in a detachable manner;
   the body is provided with the accommodating cavity running through upper and lower portions, and the accommodating cavity is provided with an upper opening for placing the storage member from top to bottom; and
   the storage member or the body is rotationally connected with a rolling member capable of driving garbage to enter the cavity structure.

2. The automatic water surface skimmer according to claim 1, wherein
   the anti-collision assembly comprises three anti-collision wheels arranged in a staggered manner, the three anti-collision wheels are arranged in a regular triangle shape, and axis extension directions of the anti-collision wheels are in parallel;
   the connecting member is a triangular member, and protruding side ends of the connecting member are respectively connected with one anti-collision wheel.

3. The automatic water surface skimmer according to claim 1, wherein
   the rolling member is assembled with a sheet structure capable of producing a water flow and the sheet structure is adjacent to the opening in the upper end of the cavity structure;
   the sheet structure is a strip-shaped blade or brush member, and an upper edge of the strip-shaped blade is higher than an upper edge of the storage member;
   projections of the strip-shaped blade and the opening in the upper end of the storage member in a vertical direction at least partially coincide;
   two sides of a rear end of the body are respectively assembled with a driver for pushing the body to move.

4. An automatic water surface skimmer, comprising a body with an accommodating cavity and a storage member with at least one through hole, wherein
the storage member is a cavity structure with an opening in an upper end and is assembled on the body in a detachable manner;
the body is provided with the accommodating cavity running through upper and lower portions, and the accommodating cavity is provided with an upper opening for placing the storage member from top to bottom;
the storage member or the body is rotationally connected with a rolling member capable of driving garbage to enter the cavity structure;
the rolling member is assembled with a sheet structure capable of producing a water flow and the sheet structure is adjacent to the opening in the upper end of the cavity structure;
the sheet structure is a strip-shaped blade or brush member, and an upper edge of the strip-shaped blade is higher than an upper edge of the storage member;
projections of the strip-shaped blade and the opening in the upper end of the storage member in a vertical direction at least partially coincide; and
two sides of a rear end of the body are respectively assembled with a driver for pushing the body to move.

5. The automatic water surface skimmer according to claim 4, wherein
the rolling member is assembled at an upper end portion of the storage member and is connected with a driving source;
the driving source is assembled on the body and is connected with the rolling member through a gear set;
the gear set comprises a gear I fixedly connected with the rolling member and a gear II fixedly connected with a rotating end of the driving source; a face of the gear I is perpendicular to an axial extension line of the rolling member; a face of the gear II is perpendicular to an axial extension line of the rotating end of the driving source.

6. The automatic water surface skimmer according to claim 5, wherein
the storage member is provided with a holding part or a holding member which is convenient for a user to hold, and a cover plate is provided above the holding part or holding member;
one end of the cover plate is hinged on the body, and a cover face of the cover plate partially or completely covers the opening in the upper end of the storage member;
an other end of the cover plate is connected with a lifting assembly for driving the cover plate to go up and down; the lifting assembly is an air rod, a hydraulic rod, or a ball screw assembly;
the storage member is provided with a connecting part for assembling the rolling member, and the connecting part is an arc-shaped structure rotationally connected with the rolling member and mounted on the body;
two sides of an internal portion of the body are respectively provided with an arc-shaped notch; the arc-shaped structure is fit with the shape of the arc-shaped notch;
an inner wall of an upper end of the accommodating cavity of the body is provided with at least one section of retaining part; the retaining part extends into the accommodating cavity to form a supporting structure capable of abutting against the storage member;
an outer wall of the upper end of the storage member is provided with at least one section of protruding rib; the protruding rib extends outwards, protrudes out of a main body of the storage member and is capable of mounted on an upper wall surface of the retaining part of the body;
a vertical distance between the upper wall surface of the retaining part and an upper end surface of the body is A; a vertical distance between a lower wall surface of the protruding rib and an upper end surface of the storage member is B; A is greater than or equal to B.

7. The automatic water surface skimmer according to claim 6, wherein
the holding member is a handle member horizontally provided on two sides or two ends of the storage member;
the handle member is located at a transverse center of gravity of the storage member;
a lower end of the storage member is fixedly connected with a disinfection box with an accommodating space;
the disinfection box is provided with several holes, and a box cover of the disinfection box is detachably assembled on a main body of the disinfection box;
the cover plate is obliquely assembled on the body, a front end of the cover plate is lower than a rear end, and the front end and the rear end are in smooth transition; the rear end of the cover plate is hinged on the body and the front end is clamped on the body;
an upper end surface of the cover plate is covered with a solar panel for absorbing solar energy, and a transparent window which is convenient for observing a collection situation of the storage member is provided in a central position of the cover plate;
a lower end of the body is provided with a trumpet-shaped opening at a position adjacent to the rolling member, and an outer diameter of the trumpet-shaped opening is larger than an inner diameter;
the cavity structure of the storage member is a box structure with a front wall surface, a rear wall surface, a left wall surface, a right wall surface, and a lower wall surface; at least the rear wall surface and the lower wall surface are respectively provided with several through holes;
one of the connecting part of the storage member and the cover plate is provided with a square groove, and the other is provided with a square protrusion; structural shapes of the square groove and the square protrusion are fit with each other.

8. The automatic water surface skimmer according to claim 4, wherein
an outer edge of the body is provided with an anti-collision assembly;
the anti-collision assembly comprises three anti-collision wheels arranged in a staggered manner, the three anti-collision wheels are arranged in a regular triangle shape, and axis extension directions of the anti-collision wheels are in parallel;
a connecting member is a triangular member, and protruding side ends of the connecting member are respectively connected with one anti-collision wheel.

9. The automatic water surface skimmer according to claim 8, wherein
a pin hole I for connecting the body is provided in a center of the triangular member,
pin holes II for connecting the anti-collision wheels are respectively provided in triangular side ends of the triangular member;

the triangular member is pinned on the body in a rotatable manner through the pin hole I;

the anti-collision wheels are pinned on the triangular member in a rotatable manner through the pin holes II.

10. The automatic water surface skimmer according to claim 9, wherein the body is a square structure, and four side ends or two side surfaces of a front end of the square structure are respectively provided with one anti-collision assembly;

the anti-collision assembly is partially or completely exposed out of the body.

11. The automatic water surface skimmer according to claim 10, wherein the body is provided with a mounting cavity for accommodating part of a structure of the anti-collision assembly;

at least two anti-collision wheels are exposed out of the mounting cavity.

12. The automatic water surface skimmer according to claim 4, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

13. The automatic water surface skimmer according to claim 4, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

14. The automatic water surface skimmer according to claim 5, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

15. The automatic water surface skimmer according to claim 6, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

16. The automatic water surface skimmer according to claim 7, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

17. The automatic water surface skimmer according to claim 8, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

18. The automatic water surface skimmer according to claim 9, wherein two sides of a front end of the body are respectively provided with a mounting cavity with an opening in a front end for mounting a ranging sensor;

the ranging sensor is assembled deep in the mounting cavity, and a transmitting end of the ranging sensor faces to the opening in the front end of the mounting cavity;

there is a certain distance between the transmitting end and the opening in the front end;

the ranging sensor is a laser ranging sensor, an ultrasonic ranging sensor, or an infrared ranging sensor.

19. An automatic water surface skimmer, comprising a body with an accommodating cavity and a storage member with at least one through hole, wherein the storage member is a cavity structure with an opening in an upper end and is assembled on the body in a detachable manner;

the body is provided with the accommodating cavity running through upper and lower portions, and the accommodating cavity is provided with an upper opening for placing the storage member from top to bottom;

the storage member is provided with a holding part or a holding member which is convenient for a user to hold, and a cover plate is provided above the holding part or holding member;

one end of the cover plate is hinged on the body, and a cover face of the cover plate partially or completely covers the opening in the upper end of the storage member.

* * * * *